United States Patent Office 3,362,510
Patented Jan. 9, 1968

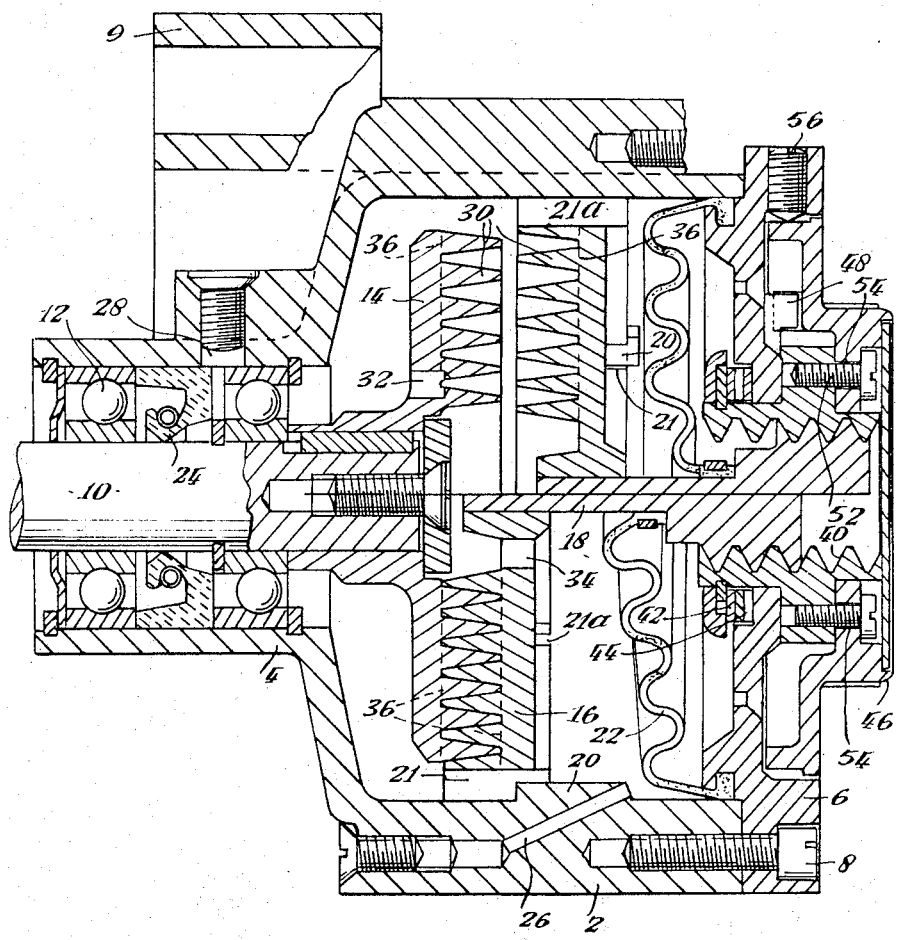

3,362,510
LIQUID SHEAR ROTARY DAMPERS
Alan Richard Brine Nash, 39 Abbot's Ride,
Surrey, Farnham, England
Filed Nov. 29, 1965, Ser. No. 510,241
Claims priority, application Great Britain, Dec. 10, 1964,
50,319/64
7 Claims. (Cl. 188—90)

ABSTRACT OF THE DISCLOSURE

The invention involves a continuous rotation damper in which a large viscous film area is provided in a compact volume by the provision of annuli or conical section on intermeshing rotor and stator members. Variation of the damping rate, by axial displacement of the stator member gives a high ratio of minimum to maximum damping rates for a relatively small stator movement.

This invention relates to continuous rotation dampers, that is to say, dampers which are arranged to be connected to a continuously rotating input shaft to apply a damping torque to the shaft.

According to the invention, there is provided a continuous rotation damper comprising a fluid-filled casing containing respective co-operating rotor and stator faces which are spaced from each other along the rotary axis, one of the said faces being formed by at least one element concentric to the rotary axis and having a pair of opposed conically tapered surfaces that converge towards the other of the faces, said other face comprising a mating element or elements having tapered surfaces complementary to the tapered surfaces of said one face. Advantageously, relative axial adjustment means are provided to permit said surfaces of the respective faces to be brought towards and away from each other so as to alter the damping rate.

Preferably the half cone angle of the respective tapered surfaces of each element is equal and opposite and it is desirable in any case that the angle of taper should be relatively small, for example, not substantially more than 8°, to avoid undue sensitivity to axial adjustment movements.

The invention will be more particularly described with reference to the accompanying drawing which shows one form of damper according to the invention in a cross-sectional view, the stator of the device being shown in a minimum drag position in the upper half of the figure and in a fully intermeshed position in the lower half.

Referring to the drawings, the damper comprises a main outer casing 2 extending to an integral bearing housing 4 at one end. At its other end, an end cover 6 is secured to the casing by bolts 8. Attachment lugs such as 9 are integral with the casing for the mounting of the damper to an external location. A drive shaft 10 extends through the bearing sleeve, where it is supported by ball races 12, into the interior of the casing 2 and has a rotor 14 keyed and bolted to it.

A stator 16 arranged to co-operate with the rotor member 14 is secured to a stub shaft 18 and the stator and its shaft are restrained from rotation by keys 20 on the inner wall of the casing which fit in keyways 21 in the stator periphery. A flexible bellows-form sealing disc 22 is clamped at its inner periphery to the stub shaft and at its outer periphery it is gripped between the casing 2 and the end cover 6. The interior of the casing from the disc 22 to a lip seal 24 between the ball races 12 forms a fluid-tight chamber which can be filled with a suitable damping liquid through channel 26, a bleed outlet being provided at 28.

By employing a flexible member such as 22 as a bounding surface of the fluid chamber of the damper, changes of volume of the damping fluid, e.g. due to temperature changes, are automatically compensated for.

The adjacent faces of the rotor and stator are each formed with a concentric series of elements in the form of annular ridges 30. Each ridge comprises a pair of frusto-conical surfaces that are oppositely tapered to converge away from the root of the ridge. The two series of ridges are staggered radially relative to each other and are of complementary profile so that when the rotor and stator are brought together, as shown in the lower half of the drawing, the two series of ridges in effect mesh without quite touching, the layer of damping fluid put into shear by the rotation of the rotor thereby ultimately being reduced to a thin film over a large area. It will be appreciated that this allows a very high maximum damping rate to be achieved. As the gap between the rotor and stator is widened, their grooves come out of mesh and the fluid in the grooves of the rotor tends to be carried round with the rotation of that part. In the minimum drag position the damping effect between the rotor and stator approximates to that of a pair of widely separated discs. An important result of this is that the ratio of maximum to minimum damping torque can be very high and it is possible to realise a ratio of some 40:1 with the illustrated construction.

It will be noted that the stator ridges encompass the rotor ridges in the radial direction and can be regarded as forming a complementary female face to the male rotor face. The distance between the rotor and the casing wall is thereby kept relatively large so that the minimum damping rate is not unduly raised by the proximity of these two parts.

The taper of both surfaces of the respective ridges is equal and has a half-cone angle of some 8°. Other angles may be used but preferably the taper is kept relatively small so that change of damping rate is not over-sensitive to the axial spacing of the rotor and stator.

Relative axial movement between the stator and rotor is achieved by axial movement of the stub shaft 18 carrying the stator. Remote from its stator end, the shaft has an enlarged diameter portion on the periphery of which there is a multi-start thread extending for about one full turn. This engages in a corresponding female thread in a sleeve 40 that is held axially on the end cover 6 by locating rings 42 and a radially corrugated packing washer 44 is provided which takes up any slight axial clearance arising from manufacturing tolerances and also offers a friction force acting rotationally to hold the sleeve 40 in any pre-set position. To rotate the sleeve 40 between such positions an external adjustment knob 46 is secured to it. Abutment elements 48 on the end cover and knob respectively limit the rotation of the knob to slightly less than one complete revolution. Rotation of the knob 46 and sleeve 40, since the shaft 18 and the stator 16 are rotationally fixed, will move the stator axially by means of the threaded engagement between the shaft and sleeve.

Axial flow of the damping fluid that might be generated by the movements of the stator is allowed to take place freely through apertures 32 34 in the rotor and stator respectively while, between each adjacent pair of keys, the stator has a dummy keyway 21a as a further provision for such axial flow.

The knob is preferably calibated to alow predetermined adjustment of the damping rate to be effected. To facilitate the assembly of the device, bolts 52 securing the knob to the sleeve 40 pass through arcuate slots 54 in the knob so that initial adjustment of its angular position can be controlled. A locking screw 56 in the end cover allows the knob to be secured in a desired angular position during operation.

The illustrated construction is also provided with radial grooves 36 on the adjacent faces of the rotor and stator. A series of twelve equispaced grooves are provided on the rotor face and a series of eleven on the stator face. Their function is to prevent breakdown of the damping fluid film when this is under a high viscous shear stress.

The formation of relatively deep grooves of small taper such as those illustrated can be difficult if close intermeshing of the stator and rotor is to be obtained. If the two parts are produced by die casting, the annular ridges may show some ovality while cutting of the radial slots will form projecting burrs and, in any case, there may be a significant degree of eccentricity between the mountings of the two parts.

In order to overcome these difficulties spark machining is preferably carried out on the stator and rotor as a finishing operation in their manufacture. The parts are mounted in the casing, the ball bearing mounting of the rotor shaft being replaced by a rigid, electrically insulating bush and a micrometer feed device engages the stator so that it can be slowly advanced towards the rotor. A flow of dielectric fluid is directed through the interior of the casing and as a pulsating voltage is applied between the stator and rotor, the rotor is slowly rotated on its bush. The resultant sparking erodes the closest regions of the two parts so that sharp-edged burrs are quickly removed and ovality and relative eccentricity are gradually eliminated. It will be seen that the process produces a matched stator/rotor pair that are then used together and by this means very close intermeshing is obtainable, leading to correspondingly high maximum damping rates.

What I claim and desire to secure by Letters Patent is:

1. A continuous rotation damper comprising, in combination, a fluid-filled casing, respective co-operating rotor and stator members within the casing, first mounting means between the rotor and the casing for attachment of the rotor to external rotary means, second mounting means between the stator and the casing to locate the stator therein co-axially with said rotary means, complementary annular regions being provided on the rotor and stator to cause a damping effect by co-action with each other, a series of annular elements concentric to the rotary means axis being formed in each region, each element having a pair of opposed conically tapered surfaces that converge towards the other of said annular regions, the first mounting means providing a fixed axial location in the casing for the rotor, the second mounting means comprising at least one key and slot engagement between the stator and the casing permitting axial movement of the stator, control means carried by the casing being connected to the stator to adjust its axial location on is mounting means in order to vary the damping rate by bringing said annular regions towards and away from each other between extreme relative setting in one of which the elements of the respective annular regions intermesh with each other and in the other of which they are axially spaced from each other, the annular elements of both the stator and the rotor being provided with a series of radial grooves which extend from the base thereof outwardly through the outer extremity of said elements and divide the annular elements into a plurality of separate arcuate segments, the grooves of the annular elements of both the stator and the rotor being equally spaced and the number of grooves in the two series being prime to each other.

2. A continuous rotation damper comprising, in combination, a fluid-filled casing, a rotor member and a stator member within the casing, carrier means for mounting said members coaxially within the casing on a rotary axis so as to face each other along said axis, adjacent end faces on said members having coacting annular elements, one end face having at least one said element concentric to the rotary axis and providing a pair of opposed conically tapered surfaces that converge towards the other of the members, a plurality of said elements on said other end face providing tapered surfaces complementary to the tapered surfaces of said one end face, axial movement means attached between the stator member and the casing comprising an adjustment member extending externally of the casing and rotatable coaxially to the stator and rotor members, a portion of the adjustment member being screwthreaded and a screwthreaded portion arranged on the stator member being in operative location therewith, key and groove means being provided between the stator member and the casing to prevent rotation of the stator member when the adjustment member is rotated to move the stator member axially along the interior of the casing to bring said surfaces of the repsective faces towards and away from each other to vary the damping rate.

3. A damper according to claim 2 in which the half cone angle of the tapered surfaces of each element does not substantially exceed 8°.

4. A damper according to claim 2 in which a series of grooves directed outwardly from the axis of rotation is provided in each annular element of at least one of the members, said grooves dividing each annular element into a plurality of arcuate segments.

5. A damper according to claim 2 in which a flexible circumferential seal has respective annular bounding portions secured to the stator member and to the casing.

6. A damper according to claim 2 in which the rotor member is radially spaced from the casing wall, an element of the stator member face being radially outwardly spaced from said rotor member and the radially outermost tapered surface of the rotor face being associated with a complementary inwardly directed surface formed on said outwardly spaced element of the stator face.

7. A damper according to claim 2 in which the rotor and stator faces are matched to each other by a process of spark machining arranged to remove ovality and relative eccentricity therebetween.

References Cited

UNITED STATES PATENTS

| | | | |
|---|---|---|---|
| 1,238,447 | 8/1917 | Severy. | |
| 1,535,238 | 4/1925 | Miller | 192—94 |
| 1,646,694 | 10/1927 | Holmes | 192—94 |
| 2,989,616 | 6/1961 | Moronoff. | |
| 3,019,875 | 2/1962 | Fowler | 198—58 |
| 3,046,206 | 7/1962 | Johnson et al. | 204—224 |
| 3,101,825 | 8/1963 | Caroli et al. | 192—58 |

FOREIGN PATENTS

| | | |
|---|---|---|
| 426,813 | 5/1911 | France. |

FERGUS S. MIDDLETON, *Primary Examiner.*

MILTON BUCHLER, *Examiner.*

G. E. HALVOSA, *Assistant Examiner.*